United States Patent [19]

Ferriter

[11] Patent Number: 5,212,635

[45] Date of Patent: May 18, 1993

[54] METHOD AND APPARATUS FOR MEASUREMENT OF MANUFACTURING TECHNICIAN EFFICIENCY

[75] Inventor: Kate M. Ferriter, Atlanta, Ga.

[73] Assignee: International Business Machines Corporation, Armonk, N.Y.

[21] Appl. No.: 425,640

[22] Filed: Oct. 23, 1989

[51] Int. Cl.$^5$ .................. G06F 15/21; G06F 15/46
[52] U.S. Cl. ............................... 364/402; 364/401; 364/468; 340/309.15
[58] Field of Search ............... 364/188, 401, 402, 406, 364/705.07, 468; 340/309.15; 368/10, 89

[56]     References Cited
      U.S. PATENT DOCUMENTS

| | | | |
|---|---|---|---|
| 4,392,119 | 7/1983 | Price et al. | 364/401 X |
| 4,413,277 | 11/1983 | Murray | 358/93 |
| 4,583,280 | 4/1986 | Corrigan et al. | 29/563 |
| 4,625,086 | 11/1986 | Karino | 219/10.55 B |
| 4,701,849 | 10/1987 | Elden | 364/401 |
| 4,847,791 | 7/1989 | Martin et al. | 364/554 |
| 4,899,292 | 2/1990 | Montagna et al. | 364/521 |
| 5,068,787 | 11/1991 | Pipella et al. | 364/406 |
| 5,121,319 | 6/1992 | Fath et al. | 364/188 |

FOREIGN PATENT DOCUMENTS 2584214 6/1985 France .
0035208 4/1981 Japan .
2034890A 10/1979 United Kingdom .

OTHER PUBLICATIONS

Webster's II New Riverside University Dictionary, entry for "Graphical".
Patent Abstracts of Japan, Group No. P065, Nishida, Abstract No. 56-35208, Apr. 7, 1981.
Patent Abstracts of Japan, Group No. M253, Takeuchi, Abstract No. 58-132437, Aug. 6, 1983.
Patent Abstracts of Japan, Group No. P241, Uno, Abstract No. 58-15179, Sep. 8, 1983.
Patent Abstracts of Japan, Group No. M836, Suga, Abstract No. 1-58462 Mar. 6, 1989.
Patent Abstracts of Japan, vol. 13, No. 65 (M-797) (3413) 14 Feb. 1989 & JP-A-63 267 149 (Brother) 4 Nov. 1988.
Patent Abstracts of Japan, vol. 9 No. 44 (P-337) (1767) 23 Feb. 1986 & JP-A-59 184 958 (Hitachi) 20 Oct. 1984.
Patent Abstract of Japan, vol. 7 No. 290 (P-245) (1435) 24 Dec. 1983 & JP-A-58 163 070 (Hitachi) 27 Sep. 1983.
Patent Abstracts of Japan, vol. 6, No. 183 (P-143) (1061) 18 Sep. 1982 & JP-A-57 098 066 (Kurashiki Bouseki) 18 Jun. 1982.

Primary Examiner—Roy N. Envall, Jr.
Assistant Examiner—David Huntley
Attorney, Agent, or Firm—Andrew J. Dillon

[57]         ABSTRACT

A method and apparatus are disclosed for measuring the efficiency of a manufacturing technician in the performance of selected operations within a computer based manufacturing process. A manufacturing process plan is stored within a computer system having a visual display. Those operations within the manufacturing process plan having a known labor standard time value are identified and the labor standard time value for each such operation is stored within the computer system. Upon the initiation of an operation having a known labor standard time value a graphic representation, such as an hourglass, is automatically presented displaying the amount of elapsed time since initiation of the selected operation and the amount of time remaining within the labor standard time. In one embodiment of the present invention, the elapsed time value may be stored, upon the temporary suspension of the selected operation, and subsequently displayed upon the reactivation of the suspended operation.

12 Claims, 3 Drawing Sheets

METHOD AND APPARATUS FOR MEASUREMENT OF MANUFACTURING TECHNICIAN EFFICIENCY

CROSS-REFERENCE TO RELATED APPLICATION

The present application is related in subject matter to U.S.. Pat. Application Ser. No. 07/425,786 entitled "Method and System for Generation of Manufacturing Process Plans," now U.S. Pat. No. 5,134,560, filed of even date herewith, assigned to the assignee hereof, and incorporated herein by reference thereto.

BACKGROUND OF THE INVENTION

1. Technical Field

The present invention relates in general to improvements in manufacturing technology and in particular to improvements in manufacturing technology in computer based manufacturing process plans. Still more particularly, the present invention relates to a method and apparatus for the measurement of manufacturing technician efficiency and the provision of feedback to the manufacturing technician within a computer based manufacturing process plan.

2. Description of the Related Art

Manufacturing technology has long had as its primary goal the ability to consistently produce a high quality product. Over the years, the efforts which have been made to achieve this goal have been directed primarily to the improvement of the documentation which is utilized by the manufacturing technician or floor operator during the manufacturing process. However, the rapidity with which the manufacturing process evolves often renders hard copy documentation obsolete soon after it has been distributed. The probability that the primary documentation utilized by the floor operator is either downlevel or incomplete will often result in degradation in either product quality or consistency.

As a result of the aforementioned problem, it has been a recent goal in manufacturing circles to implement the so-called "Paperless Factory." The foremost object of a Paperless Factory system is to provide high quality information on the manufacturing plant floor. High quality information in this sense is information which is current, understandable, complete and consistent. Product data currency is a key issue in those areas where manufacturing is presented with frequent Engineering Change (EC) activities. The level of detail and clarity of the information provided to the manufacturing plant floor is important and its value is clearly reflected in the quality of the physical product which is being manufactured.

There are several additional motivations for the implementation of a Paperless Factory. The most obvious motivation is the ability to provide highly current data and configuration management to the shop floor. The information being utilized by the manufacturing technician on the manufacturing shop floor in performing the manufacturing or repair operation should be the most advanced Engineering Change (EC) level available.

A well implemented Paperless Factory will also eliminate or reduce the process specifications and documentation presented in paper format to the shop floor and replace those specifications with on line operator guidance which meets the shop floor requirement of high quality current information. Another advantage of the Paperless Factory implementation is the elimination of the shear volume of hard copy information required for the manufacturing process. It is not uncommon in certain manufacturing processes to require several hundred pieces of paper for building a particular product, such as a jet aircraft.

One possible advantage in the utilization of a Paperless Factory is the effective monitoring and documentation of the efficiency of manufacturing technicians. For example, manufacturing and industrial engineers have long promulgated so-called "labor standard times" for individual manufacturing operations which may be utilized to predict the amount of time required to complete a selected group of manufacturing operations. While these labor standard times are available, there exists no known system which permits an individual manufacturing technician to easily gauge his or her performance against such a known standard.

There do exist many prior art systems which permit the passage of elapsed time or actual time to be noted. So-called "clock and calendar" boards exist which will generate a display of the date and time of day; however, in order to measure manufacturing technician efficiency against a known standard it is necessary to know the start time as well as the completion time and perform real time calculations at each manufacturing operation.

Additionally, "count-down" techniques are well known in systems which provide an indication of the passage of a selected time span. For example, U.S. Pat. No. 4,625,086 discloses a cooking apparatus having a graphic display which indicates the passage of the selected cooking time.

None of the aforementioned systems provide a method and apparatus by which the efficiency of a manufacturing technician may be measured by automatically providing a graphic representation which indicates the amount of elapsed time and the time remaining within a predetermined time period for each manufacturing operation.

Therefore, it should be obvious that a need exists for a method and apparatus which permits the automatic and efficient measurement of manufacturing technician efficiency in the performance of selected manufacturing operations and which provides real time feedback to the manufacturing technician to enable the manufacturing technician to improve his or her performance against the measurement system.

SUMMARY OF THE INVENTION

It is therefore one object of the present invention to provide an improvement in manufacturing technology.

It is another object of the present invention to provide an improvement in manufacturing technology in the field of computer based manufacturing process plans.

It is yet another object of the present invention to provide an improvement in manufacturing technology which relates to methods and apparatus for the measurement of manufacturing technician efficiency within a computer based manufacturing process plan.

The foregoing objects are achieved as is now described. The method and apparatus of the present invention utilizes a manufacturing process plan which is stored within a computer system having a visual display. Those operations within the process plan having a known labor standard time value are identified and the labor standard time value for each such operation is stored within the computer system. Upon the initiation of an operation having a known labor standard time value by a manufacturing technician a graphic representation, such as an hourglass, is presented on the computer system visual display and displays the amount of elapsed time since the initiation of the operation and the amount of time remaining within the labor standard time. In one embodiment of the present invention, the elapsed time value may be stored, upon the temporary suspension of the operation, and subsequently displayed upon the reactivation of the suspended operation.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
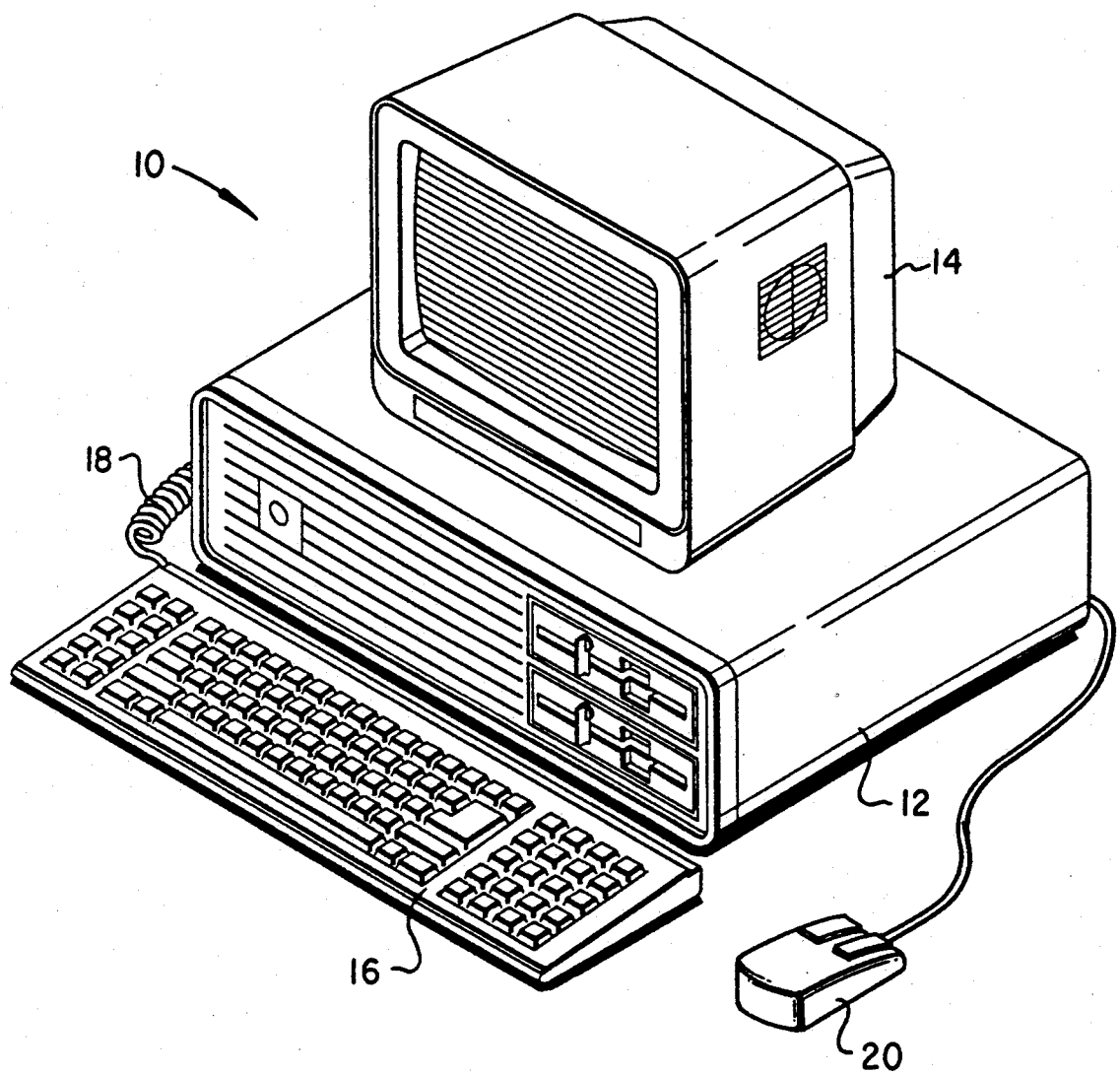
FIG. 1 is a pictorial representation of a computer system which may be utilized with the method of the present invention.

With reference now to the FIGURES and in particular with reference to FIG. 1, there is depicted a pictorial representation of a computer system 10 which may be utilized with the method of the present invention. As may be seen, computer system 10 includes a processor 12 which preferably includes a graphics processor, memory device and a central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to processor 12 by means of cable 18.

Upon reference to the foregoing, those skilled in the art will appreciate that computer 10 may be implemented utilizing a so-called personal computer, such as the Model 50 PS/2 computer manufactured by International Business Machines Corporation of Armonk, New York.

Figure 2:
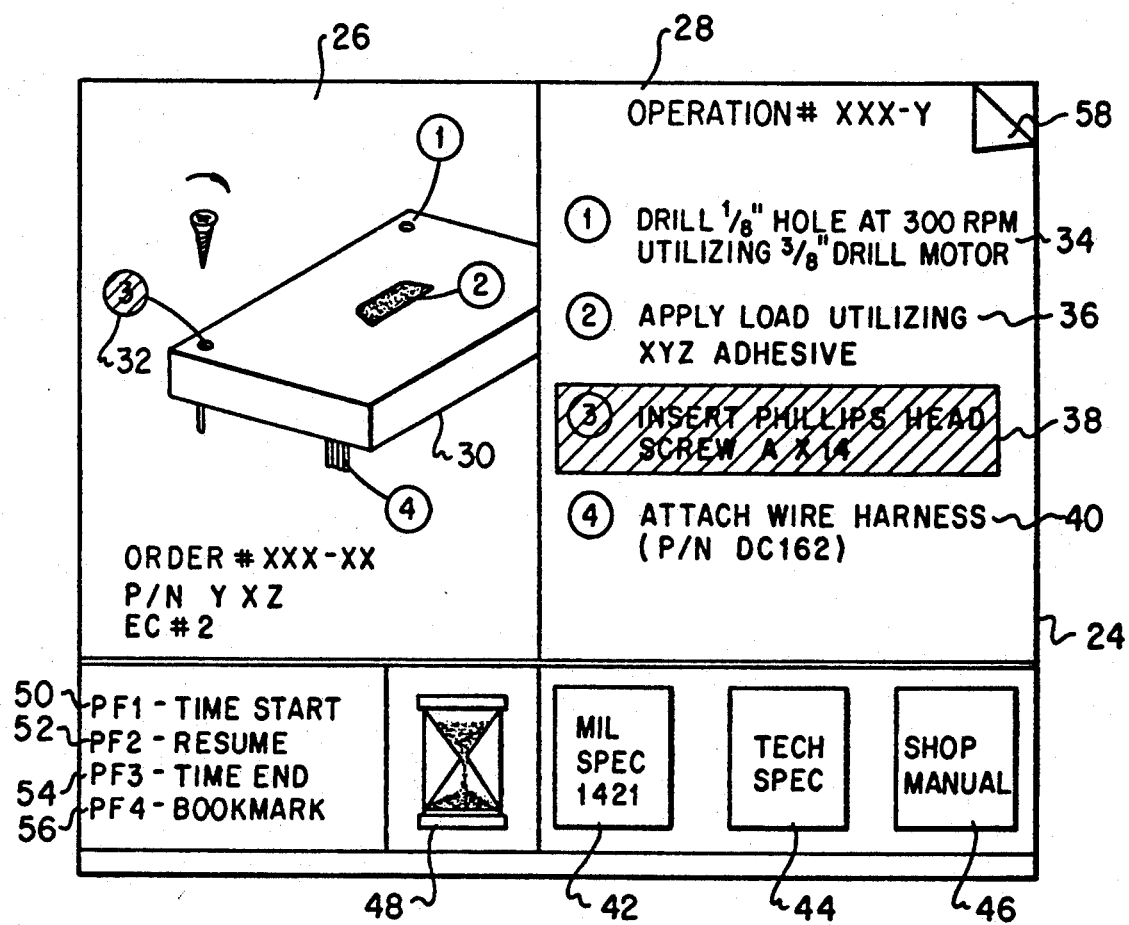
FIG. 2 is a pictorial representation of a computer display screen depicting the operation of the method of the present invention.

Referring now to FIG. 2, there is depicted a pictorial representation of a computer display screen 24, which depicts the operation of the method of the present invention. As may be seen, display screen 24 has been divided into two halves, including an image half 26 and a textual instruction half 28.

Displayed visually within image half 26 of display screen 24 is an image 30 of a product which is to be manufactured by a process which is at least partially defined by numbered textual instructions 34, 36, 38, and 40, which are displayed within textual instruction half 28. As is illustrated, image half 26 of display screen 24 also preferably discloses the order number, part number and Engineering Change (EC) version of the product for which the manufacturing process is displayed. Additionally, image 30 preferably includes a plurality of reference numerals, such as reference numeral 32, which corresponds to numbered textual instruction 38, thereby permitting a simple correspondence between particular textual instructions and image 30.

As is illustrated, textual half 28 of display screen 24 preferably includes a plurality of numbered textual instructions, such as textual instructions 34, 36, 38, and 40. Each textual instruction includes a sequential number which is also utilized, as discussed above, within image half 26 of display screen 24 to refer to a physical point within image 30, wherein the operation described within an associated textual instruction will take place.

As those skilled in the art will appreciate, mouse 20 (see FIG. 1) may be utilized to locate a mouse pointer (not shown) at any point within display screen 24 and may be utilized to select a particular operation for processing by the manufacturing technician. Similarly, a graphical pointing device such as mouse 20 may also be utilized to select one or more reference documents, such as reference documents 42, 44, or 46, which may be displayed in an iconic representation within display screen 24. In a manner well known in the art, the illustrated reference documents may be selected by means of mouse 20 and expanded to permit a manufacturing technician to refer to these reference documents during the processing of a manufacturing operation.

Also displayed within display screen 24 are a plurality of commands including: TIME START; RESUME; TIME END; and, BOOKMARK, referred to at reference numerals 50, 52, 54 and 56, respectively. Of course, those skilled in the art will appreciate that these commands are merely illustrative of those types of commands which may be utilized in an application of this type and that additional commands may also be utilized. As is illustrated, each command may be selected by depressing an appropriate Program Function key or, may be selected graphically utilizing mouse 20 (see FIGURE or other suitable graphical pointing device.

Referring again to display screen 24 of FIG. 2, an important feature of the method and apparatus of the present invention is illustrated. Depicted within the lower region of image half 26 of display screen 24 is a graphical elapsed time representation 48. As is illustrated, in the depicted embodiment of the present invention graphical elapsed time representation 48 takes the form of an hourglass; however, other graphical representations may be also utilized. In accordance with this feature of the present invention, certain of the selected operations listed within textual instruction half 28 of display screen 24 have predetermined labor standard time values associated therewith. Upon the selection of an operation having a known labor standard time value, graphical elapsed time representation 48 may be utilized to permit the manufacturing technician to judge his or her efficiency against a known standard.

After the selection of an operation listed within textual instruction half 28 of display screen 24, the operator may select command 50, indicating that he or she has begun the selected operation. Alternatively, the failure of the manufacturing technician to indicate the initiation of an operation for which a labor standard time value exists may be responded to by the provision of a visual prompt to the manufacturing technician. Such a visual prompt may be utilized to cause the manufacturing technician to indicate the initiation of the selected operation. Thereafter, graphical elapsed time representation 48 may be utilized to indicate both the amount of elapsed time since the initiation of the selected operation by means of a graphic image of sand within the lower half of the hourglass depicted. Additionally, graphical elapsed time representation 48 may also be utilized to indicate the amount of time remaining in the labor standard time value by means of an image of sand present in the upper half of the hourglass thus depicted. In this manner, manufacturing technicians may be provided with an automatic indication of the efficiency of their actions with regard to a particular manufacturing operation, as measured against a labor standard time value which has been previously designated for that operation and stored within computer system 10 (see FIG. 1).

Figure 3:
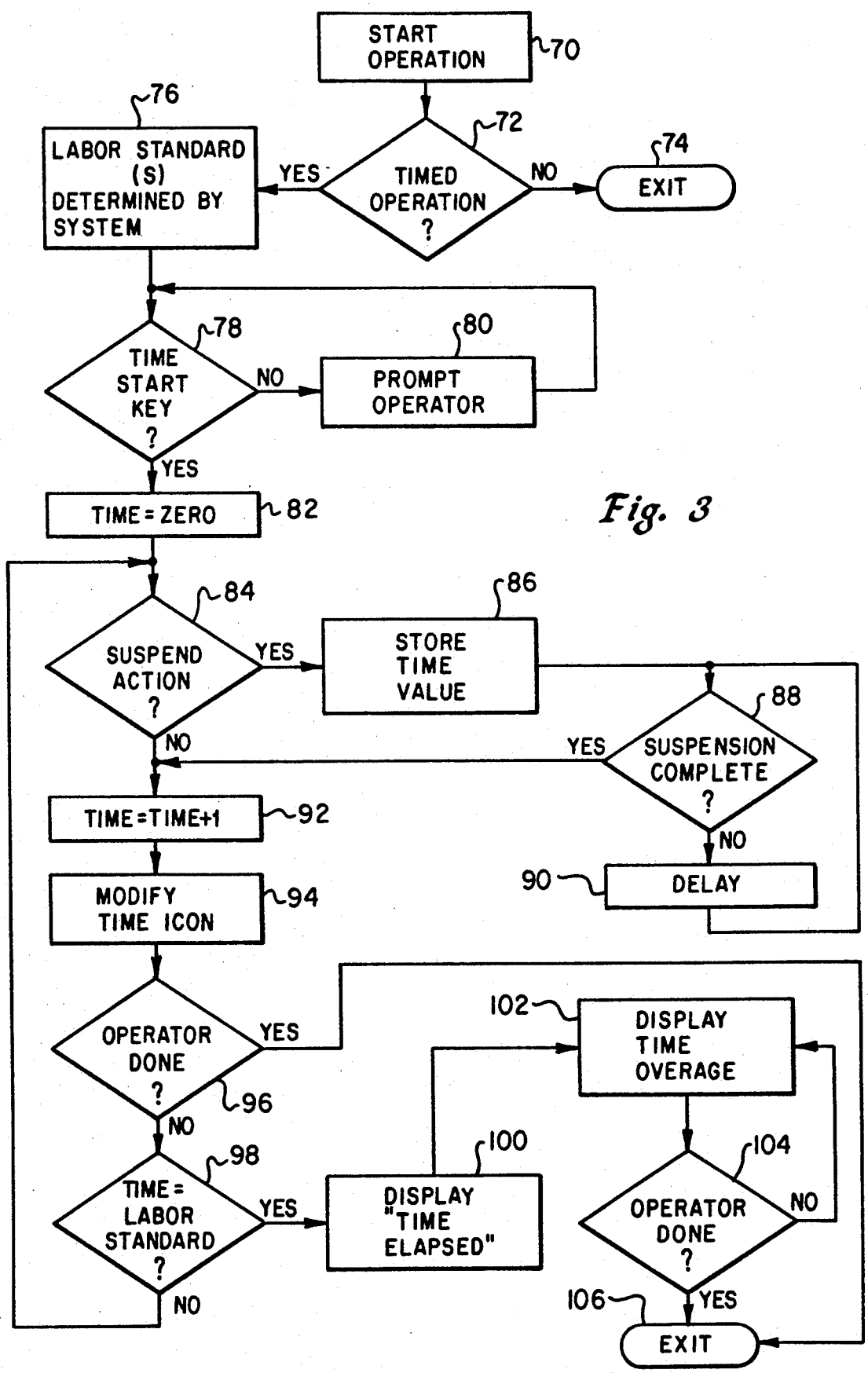
FIG. 3 is a high-level flow chart depicting the method of the present invention.

With reference now to FIG. 3, there is depicted a high level flow chart which illustrates the method of the present invention. As may be seen, the process begins at block 70 which depicts the initiation of an operation which is listed within textual instruction half 28 of display screen 24 (see FIG. 2). Thereafter, block 72 depicts a determination of whether or not the operation thus selected is a timed operation. If not, the process terminates, via block 74.

In the event the manufacturing operation selected by the manufacturing technician is a timed operation, as determined by block 72, then block 76 illustrates the determination of the labor standard time (S) for that operation by the system. Those skilled in the art will appreciate that labor standard times for individual manufacturing operations may be simply and easily stored within computer system 10 and thereafter utilized to implement the method of the present invention.

Next, block 78 depicts the determination of whether or not the TIME START key has been depressed or selected. If not, block 80 indicates the prompting of the operator for such input. After the TIME START key has been selected, as determined by block 78, then block 82 illustrates the initialization of the time value. Next, block 84 depicts a determination of whether or not the operation in progress is to be suspended. If so, block 86 illustrates the storing of the current value of time. Thereafter, the process passes to block 88 which depicts a determination of whether or not the suspension period has been completed. If not, the process delays a predetermined period of time, as illustrated in block 90, and thereafter returns to block 88 to once again determine whether or not the suspension period has completed.

In the event the suspension period has been completed, as determined by block 88, or never suspended the process passes to block 92 wherein the time value is incremented to indicate the passage of time during the processing of the operation. Next, block 94 illustrates the modification of the time icon, or graphical elapsed time representation, as illustrated in FIG. 2. In the case of an hourglass representation, as depicted in FIG. 2, the modification of this icon is accomplished by the increasing of the visual depiction of sand in the lower half of the hourglass and the concomitant decreasing of the amount of sand in the upper half of the hourglass.

After modifying the graphical elapsed time representation in the manner discussed above, block 96 illustrates a determination of whether or not the operator has completed the operation in question. If the operation has been completed, the process terminates, as illustrated in block 106. In the event the operator has not completed the operation, as indicated by keyboard entry or other means, then block 98 depicts a determination of whether or not the total elapsed time is equal to the labor standard time for this particular operation. If not, the process returns to block 92 to continue to increment the elapsed time value and the process continues, unless suspended, as determined by block 84.

After sufficient time has elapsed such that the elapsed time is equal to the labor standard time for the selected operation, as determined by block 98, the process passes to block 100 which depicts the displaying of "time elapsed" or another graphical indication to the manufacturing technician that the labor standard time value for this particular operation has elapsed. Next, block 102 illustrates the provision of a textual display which indicates the amount of time which has elapsed, over and above the labor standard time period. Block 104 depicts a continued determination of whether or not the operator has completed the operation, and is utilized, in conjunction with block 102, to periodically update the time average display until such time as the operator has completed the operation. Thereafter, the process terminates, as illustrated in block 106. Of course, those skilled in the art will appreciate that additional graphic variations may be employed. For example, the hourglass display may change colors to indicate the amount of time remaining within the labor time standard.

Upon reference to the foregoing, those skilled in the art will appreciate that the Applicant has provided a novel method whereby a manufacturing technician in a computer based manufacturing process plan may simply, easily and automatically measure his or her efficiency against a predetermined labor standard time for a particular manufacturing operation in progress. In this manner, the performance of the manufacturing technician may be utilized to enhance the technician's efficiency and may also be recorded or reported to a system wide control to determine which manufacturing technicians require additional training or which technicians are particularly skilled at selected operations.

While the invention has been particularly shown and described with reference to a preferred embodiment, it will be understood by those skilled in the art that various changes in form and detail may be made therein without departing from the spirit and scope of the invention.

What is claimed is:

1. A method in a computer system based manufacturing process for providing an indication of the efficiency of a manufacturing technician in the performance of selected operations within a manufacturing process, said method comprising the steps of:

storing a plurality of labor standard time values within said computer system which predict the amount of time required to complete each of a plurality of operations within a manufacturing process;

displaying within said computer system a sequence of textual instructions for performing a plurality of operations within said manufacturing process;

noting the selection of a particular one of said sequence of textual instructions by a manufacturing technician;

determining a selected one of said plurality of operations within a manufacturing process which is initiated by performance of said particular one of said sequence of textual instructions;

retrieving a labor standard time for said selected one of said plurality of operations;

noting an initiation of said selected one of said plurality of operations by said manufacturing technician; and automatically displaying within said computer system an indication of the passage and completion of said labor standard time for said selected one of said plurality of operations until completion of said selected one of said plurality of operations wherein the performance of said manufacturing technician may be measured against said labor standard time for said selected one of said plurality of operations.

2. The method in a computer system based manufacturing process for providing an indication of the efficiency of a manufacturing technician in the performance of selected operations within a manufacturing process according to claim 1, wherein said step of automatically displaying within said computer system an indication of the passage and completion of said labor standard time for said selected one of said plurality of operations comprises the displaying of a graphical representation of the passage of said labor standard time.

3. The method in a computer system based manufacturing process for providing an indication of the efficiency of a manufacturing technician in the performance of selected operations within a manufacturing process according to claim 1, wherein said displaying of a graphical representation of the passage of said labor standard time comprises the step of displaying a graphical representation of the amount of elapsed time since the initiation of said selected operation and a graphical representation of the amount of time remaining within said labor standard time.

4. The method in a computer system based manufacturing process for providing an indication of the efficiency of a manufacturing technician in the performance of selected operations within a manufacturing process according to claim 3, wherein said step of displaying a graphical representation of the amount of elapsed time since the initiation of said selected one of said plurality of operations and a graphical representation of the amount of time remaining within said labor standard time comprises the step of displaying a variable graphic representation of an hourglass.

5. The method in a computer system based manufacturing process for providing an indication of the efficiency of a manufacturing technician in the performance of selected operations within a manufacturing process according to claim 1, wherein said step of automatically displaying within said computer system an indication of the passage and completion of said labor standard time for said selected on of said plurality of operations comprises the displaying of an iconic representation of the passage and completion of said labor standard time.

6. The method in a computer system based manufacturing process for providing an indication of the efficiency of a manufacturing technician in the performance of selected operations within a manufacturing process according to claim 1, wherein said step of noting the initiation of a selected operation within a manufacturing technician to indicate the initiation of said selected operation.

7. The method in a computer system based manufacturing process for providing an indication of the efficiency of a manufacturing technician in the performance of selected operations within a manufacturing process according to claim 1, further including the step of selectively suspending said indication of the passage and completion of said labor standard time.

8. An apparatus for providing an indication of the efficiency of a manufacturing technician in the performance of selected operations within a computer based manufacturing process, said apparatus comprising:

a computer system having a visual display;
means for storing a manufacturing process plan within said computer system;
means for storing a plurality of labor standard times which predict the amount of time required to complete each of a plurality of operations within said manufacturing process plan;
means for displaying within said visual display of sequence of textual instruction for performing a plurality of operations within said manufacturing process plan;
means for noting the selection of a particular one of said sequence of textual instructions by a manufacturing technician;
means for determining a selected one of said plurality of operations within said manufacturing process plan which is initiated by performance of said particular one of said sequence of textual instructions;
means for retrieving a labor standard time of said selected one of said plurality of operations within said manufacturing process plan;
means for noting an initiation of said selected one of said plurality of operations by said manufacturing technician; and
means for automatically displaying within said visual display an indication of the passage and completion of a labor standard time for said selected one of said plurality of operations until completion of said selected one of said plurality of operations wherein the performance of said manufacturing technician may be measured against said labor standard time for said selected ones of said plurality of operations.

9. The apparatus for providing an indication of the efficiency of a manufacturing technician in the performance of selected operations within a computer based manufacturing process according to claim 8, wherein said means for automatically displaying within said visual display an indication of the passage and completion of a selected labor standard time comprises means for graphically displaying within said visual display an indication of the passage of a selected labor standard time.

10. The apparatus for providing an indication of the efficiency of a manufacturing technician in the performance of selected operations within a computer based manufacturing process according to claim 9, wherein said means for graphically displaying within said visual display an indication of the passage and completion of a selected labor standard time comprises means for generating an iconic representation of the passage and completion of a selected labor standard time.

11. The apparatus for providing an indication of the efficiency of a manufacturing technician in the performance of selected operations within a computer based manufacturing process according to claim 9, wherein said means for graphically displaying within said visual display an indication of the passage of a selected labor standard time comprises means for graphically displaying the amount of elapsed time since the initiation of said selected one of said plurality of operations and the amount of time remaining within said labor standard time.

12. The apparatus for providing an indication of the efficiency of a manufacturing technician in the performance of selected operations within a computer based manufacturing process according to claim 8, further including means for suspending said indication of the passage of a selected labor standard time in response to an input from said manufacturing technician.

* * * * *